United States Patent Office 3,583,989
Patented June 8, 1971

3,583,989
PHARMACOLOGICALLY ACTIVE 2-SUBSTITUTED 11-PIPERAZINYL DIBENZO-OXEPINS
Jean Clement Louis Fouche, Hauts-de-Seine, and Andre Leger, Essonne, France, assignors to Rhone-Poulenc S.A., Paris, France
No Drawing. Filed May 22, 1968, Ser. No. 731,305
Claims priority, application France, May 23, 1967, 107,487, Patent 1,558,916
Int. Cl. C07d 51/70
U.S. Cl. 260—268                4 Claims

ABSTRACT OF THE DISCLOSURE

The invention provides new 2-substituted-11-piperazinyl-10,11-dihydrodibenzo[b,f]oxepins and their salts which are useful as neuroleptics, sedatives, tranquillizers, anti-serotonins, and antiemetics.

---

This invention relates to dibenzooxepin derivatives and their preparation.

The present invention provides the 10,11-dihydrodibenzo[b,f]oxepin derivatives of the formula:

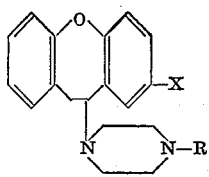

(I)

and their acid addition salts and quaternary ammonium derivatives in which X represents halogen, alkoxy of 1 to 5 carbon atoms, or alkylthio of 1 to 5 carbon atoms, and R represents hydrogen, alkyl of 1 to 5 carbon atoms, or phenylalkyl of 1 to 5 carbon atoms in the alkyl residue and the phenyl nucleus is unsubstituted or substituted by one or more of halogen, alkyl of 1 to 5 carbon atoms and alkoxy of 1 to 5 carbon atoms.

The compounds of Formula I are prepared, in accordance with the invention, by one of the following processes.

(1) By reacting a piperazine of formula:

(II)

in which R is as hereinbefore defined, with a 10,11-dihydrodibenzo[b,f]oxepin of the formula:

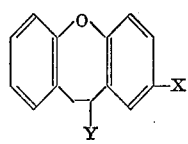

(III)

in which X is as hereinbefore defined and Y represents a reactive ester residue, such as a halogen atom or a sulphuric or sulphonic ester residue (for example a methanesulphonyloxy or p-toluenesulphonyloxy residue).

It is advantageous to carry out the operation in an organic solvent, preferably at the boiling temperature of the solvent, and to employ as condensing agent an excess of the piperazine of the Formula II.

(2) When R is not hydrogen, by reacting an ester of the formula:

Y—R'                (IV)

in which Y is as hereinbefore defined, and R' is the same as R but is not hydrogen, with a 10,11-dihydrodibenzo[b,f]oxepin of the formula:

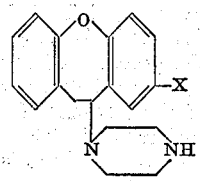

(V)

in which X is as hereinbefore defined.

It is advantageous to carry out the operation in an organic solvent such as ethanol or dimethylformamide, preferably at about 80–100° C., in the presence of an excess of the compound of the Formula V or of an alkaline agent such as sodium bicarbonate.

(3) When R is not hydrogen, by reacting an ester of the formula:

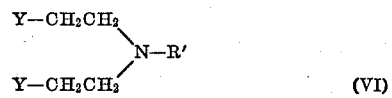

(VI)

in which Y and R' are as previously defined, with a 10,11-dihydrodibenzo[b,f]oxepin derivative of the formula:

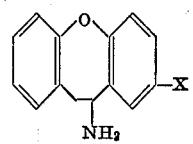

(VII)

in which X is as hereinbefore defined.

A reactive ester of Formula VI in which Y represents a chlorine atom is preferably employed. The reaction is advantageously carried out in an organic solvent such as dimethylformamide or butanol, preferably at about 80–100° C., in the presence of a basic agent such as sodium bicarbonate.

The compounds of Formula III may be prepared from the corresponding alcohols of the formula:

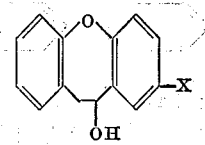

(VIII)

in which X is as previously defined, by conventional methods of preparing reactive esters from the corresponding alcohols.

The alcohols of the general Formula VIII may be prepared by reduction of the corresponding ketones of the formula:

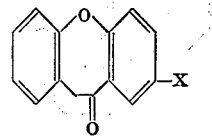

(IX)

in which X is as previously defined. This reduction may be carried out by conventional methods of reducing ketones to alcohols, more particularly by the action of an alkali metal borohydride.

The ketones of the Formula IX may be prepared by cyclisation of the products of the general formula:

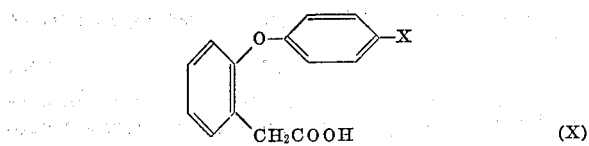

in which X is as previously defined. This cyclisation is advantageously carried out by heating the compounds of the Formula X in the presence of polyphosphoric acid, preferably at a temperature between 60° and 180° C.

The compounds of the Formula X may also be converted by conventional methods into the corresponding acid chlorides, and cyclisation of the latter may then be effected by a Friedel-Crafts reaction, for example with aluminum chloride as catalyst, in a solvent such as carbon disulphide.

The acids of Formula X may themselves be prepared from acids of the formula:

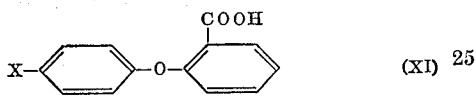

by esterification with methanol, followed by reduction of the ester obtained to the compound of the formula:

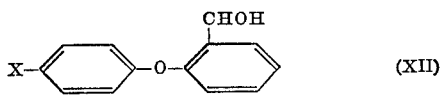

which is treated with an halogenating agent to form the compound of the formula:

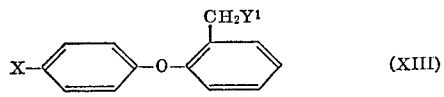

in which X is as previously defined and $Y^1$ represents a halogen atom, preferably a chlorine atom. Finally the action of an alkali metal cyanide on the compound of Formula XIII, followed by hydrolysis of the nitrile of the formula:

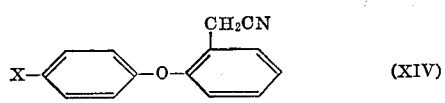

thus obtained, gives the desired compound of Formula X.

The compounds of Formula V may be prepared: either by application of the process described in (1) to piperazine and a compound of Formula III; or by the deacylation of a derivative of 11-(1-piperazinyl)-10,11-dihydrodibenzo-[b,f]oxepin of the formula:

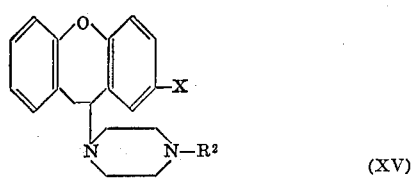

in which X is as previously defined and $R^2$ represents an alkanoyl radical of 1 to 5 carbon atoms, more especially formyl or acetyl. This deacylation is preferably carried out by heating a compound of the Formula XV in aqueous organic alkaline or aqueous acid solution.

The compounds of the Formula XV may themselves be prepared by application of the process described in (1) to a piperazine of the formula:

and a compound of Formula III, in which $R^2$, X and Y are as hereinbefore defined.

The compounds of Formula VII may be prepared in various ways, by application of methods known per se, from the corresponding ketones of the Formula IX. For example, the ketones of Formula IX may be converted into the corresponding oximes and the latter may then be reduced with sodium or sodium amalgam. The ketones of Formula IX may also be converted into the corresponding oximes, which may then be reduced with metallic zinc in acetic acid to obtain the corresponding acetamido derivatives, which are then hydrolysed to the compounds of the Formula VII.

The ketones of Formula IX may also be converted into the corresponding formamido derivatives of the formula:

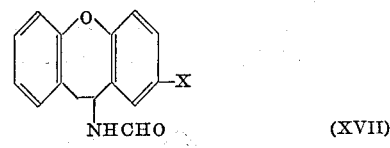

by the action of formamide in the presence of formic acid, and the compounds of the Formula XVII thus obtained may then be hydrolysed to the compounds of the Formula VII by heating in acid medium.

The compounds of Formula I may optionally be purified by physical methods (such as distillation, crystallisation or chromatography) or by chemical methods (such as as the formation of salts, crystallisation of the latter and decomposition in alkaline medium). In these operations, the nature of the anion of the salt is immaterial, provided that the salt is well-defined and readily crystallisable.

The compounds of Formula I may be converted into acid addition salts and quaternary ammonium derivatives. The acid addition salts may be obtained by the action of the bases on acids in appropriate solvents. Suitable organic solvents include for example, alcohols, ethers, ketones or chlorinated solvents. The salt formed precipitates after optional concentration of its solution and is separated by filtration or decontation. The quaternary ammonium derivatives may be obtained by the action of the new bases on reactive esters, optionally in an organic solvent, at ambient temperature or more rapidly with moderate heating.

The compounds of Formula I and their acid addition salts and quaternary ammonium derivatives, have interesting pharmacodynamic properties. They are very active on the central nervous system as neuroleptics, sedatives and tranquillisers; they also have good antiserotonin and antiemetic activity. Products of Formula I in which X is chlorine and R is alkyl of 1 to 5 carbon atoms or alkoxyphenylalkyl of 1 to 5 carbon atoms in each alkyl residue, are particularly interesting.

In the usual screening tests, the compounds of Formula I exhibit neuroleptic, sedative and tranquillising activity in the mouse in doses between 1 and 50 mg./kg. p.o., in the rat in doses between 1 and 20 mg./kg. p.o., and in the dog in doses between 0.01 and 1 mg./kg. p.o. They have antiserotonin activity in the rat when orally administered in doses between 0.5 and 10 mg./kg., and an antiemetic activity in the dog when orally administered in doses between 0.01 and 1 mg./kg.

For medicinal use, the new compounds are employed either as bases or as pharmaceutically acceptable acid addition salts or quaternary ammonium derivatives, i.e. salts or derivatives which are not toxic in the doses in which they are employed. As examples of pharmaceutically acceptable acid addition salts, there may be mentioned salts of mineral acids (such as hydrochlorides, sulphates, nitrates and phosphates) and salts of organic acids (such as acetates, propionates, succinates, benzoates, fumarates, maleates, tartrates, theophyllineacetates, salicylates, phenolphthalinates and methylene-bis - $\beta$ - hydroxynaphthoates) or substitution derivatives of these acids. As examples of pharmaceutically acceptable quaternary ammonium salts, there may be mentioned derivatives of mineral or organic esters such as methyl, ethyl, allyl or benzyl chloride, bromide or iodide, the methyl- or ethyl-sulphates, the benzenesulphonates or substitution derivatives of these compounds.

Clinically, the doses to be employed depend upon the desired therapeutic effect, upon the administration route and upon the duration of the treatment. When orally administered, they may generally be between 1 mg. and 500 mg. of active product per day for an adult.

The following examples illustrate the invention.

EXAMPLE 1

20.3 g. of 2-chloro-11-hydroxy-10,11-dihydrodibenzo-[b,f]oxepin in solution in 125 cc. of anhydrous chloroform are treated at 4–6° C. with 12.85 g. of thionyl chloride in solution in 75 cc. of anhydrous chloroform. The reaction mixture is maintained at this temperature for one hour, and then brought to 20° C. in one hour and maintained at this temperature for 2 hours 30 minutes. The solvents are evaporated under reduced pressure (30 mm. Hg), the temperature of the heating bath not exceeding 45° C. The residue is taken up in 150 cc. of anhydrous benzene and evaporated as before.

The crude 2,11-dichloro - 10,11 - dihydrodibenzo[b,f] oxepin thus obtained is dissolved in 125 cc. of anhydrous benzene and the solution obtained is poured into a boiling solution of 82 g. of 1-methylpiperazine in 250 cc. of anhydrous benzene. Reflux is maintained for 16 hours. After cooling, the products of the reaction are treated with 500 cc. of distilled water and 200 cc. of diethyl ether. The decanted aqueous solution is twice washed with a total of 200 cc. of diethyl ether, and the combined organic solutions are washed 4 times with a total of 400 cc. of distilled water and extracted 3 times with a total of 240 cc. of aqueous 2 N methanesulphonic acid solution. The combined aqueous acid solutions are treated with 0.3 g. of decolourising charcoal and then made alkaline with 70 cc. of 10 N sodium hydroxide solution. The oil which separates out is extracted 3 times with a total of 300 cc. of diethyl ether. The extracts are washed with distilled water, dried over anhydrous sodium sulphate and evaporated. The oily residue (9.95 g.) is dissolved in 20 cc. of boiling acetonitrile. After cooling for 2 hours at 3° C., the crystals which have appeared are separated, washed twice with a total of 4 cc. of ice-cold acetonitrile, and dried under reduced pressure (20 mm. Hg).

8.6 g. of 2-chloro-11-(4-methyl-1-piperazinol)-10,11-dihydrodibenzo[b,f]oxepin, M.P. 83–85° C., are thus obtained.

The starting 2-chloro - 11 - hydroxy-10,11-dihydrodibenzo[b,f]oxepin may be prepared as follows:

Preparation of methyl 2-(4-chlorophenoxy)benzoate (B.P. 143–146° C./0.4 mm. Hg; M.P. 39° C.) in accordance with Deshpande et al. J. Karnatak, Univ. 2, 33 (1957); C.A. 53, 14100c (1959).

Preparation of 306.5 g. of 2-(4-chlorophenoxy)benzyl alcohol (B.P. 153–156° C./0.4 mm. Hg; $n_D^{24}=1.5986$) by reduction of 365 g. of methyl 2-(4-chlorophenoxy) benzoate with 52.8 g. of lithium-aluminum hydride in anhydrous diethyl ether.

Preparation of 305 g. of 2-(4-chlorophenoxy)benzyl chloride (B.P. 125–129° C./0.02 mm. Hg) by the action of 192.5 g. of thionyl chloride on 306.5 g. of 2-(4-chlorophenoxy)benzyl alcohol in chloroform under reflux.

Preparation of 285.3 g. of 1-cyanomethyl-2-(4-chlorophenoxy)benzene (B.P. 148–152° C./0.4 mm. Hg; M.P. 40–41° C.) by the action of 81.9 g. of potassium cyanide on 305 g. of 2-(4-chlorophenoxy)benzyl chloride in aqueous ethanol under reflux.

Preparation of 104.2 g. of [2-(4-chlorophenoxy) phenyl]acetic acid (M.P. 118° C.) by the action of 72.5 g. of 85% potassium hydroxide on 121.8 g. of 1-cyanomethyl-2-(4-chlorophenoxy)benzene in aqueous propanol under reflux.

Preparation of 95.6 g. of 2-chloro-11-oxo-10,11-dihydrodibenzo[b,f]oxepin (B.P. 148–155° C./0.5 mm. Hg; M.P. 84° C.) by heating 144.8 g. of [2-(4-chlorophenoxy) phenyl]acetic acid at 130° C. for 3 hours in polyphosphoric acid.

Preparation of 20.3 g. of 2-chloro-11-hydroxy-10,11-dihydrodibenzo[b,f]oxepin (crude oil product) by reduction of 20.1 g. of 2-chloro-11-oxo-10,11-dihydrodibenzo [b,f]oxepin with 4.45 g. of potassium borohydride in aqueous methanol.

EXAMPLE 2

18.5 g. of 2-chloro-11-hydroxy-10,11-dihydrodibenzo-[b,f]oxepin in solution in 120 cc. of anhydrous chloroform are treated at a temperature between 4° and 6° C. with 17.8 g. of thionyl chloride in solution in 80 cc. of anhydrous chloroform. The reaction mixture is maintained at this temperature for 1 hour and then at 20° C. for 4 hours. The solvents are evaporated under reduced pressure (30 mm. Hg), the temperature of the heating bath not exceeding 40° C. The residue is taken up in 50 cc. of anhydrous benzene and evaporated as before.

The crude 2,11 - dichloro - 10,11-dihydrodibenzo[b,f] oxepin thus obtained is dissolved in 80 cc. of anhydrous acetonitrile, and the solution obtained is added in 15 minutes to a boiling solution of 61.7 g. of 1-(4-methoxybenzyl)piperazine in 120 cc. of anhydrous acetonitrile. Reflux is maintained for 15 hours. After cooling, the products of the reaction are treated with 200 cc. of distilled water, 10 cc. of 10 N sodium hydroxide solution and 100 cc. of diethyl ether. The decanted aqueous solution is washed twice with a total of 150 cc. of diethyl ether. The combined ethereal solutions are washed 4 times with a total of 400 cc. of distilled water and extracted twice with a total of 150 cc. of an aqueous normal methanesulphonic acid solution. The combined aqueous acid solutions are brought to a pH value in the neighborhood of 5 by the addition of 30 cc. of a 2 N sodium hydroxide solution. The oil which separates out is extracted with 100 cc. of diethyl ether and then 3 times with a total of 220 cc. of methylene chloride. The extracts are washed 3 times with a total of 240 cc. of distilled water, dried over anhydrous sodium sulphate, and evaporated. The oily residue (12.2 g.) is crystallised from 30 cc. of acetonitrile. The product obtained (9.8 g.; M.P. 126° C.), solvated with acetonitrile, is dissolved in 110 cc. of boiling ethanol. After cooling at 2° C. for 3 hours the crystals which have appeared are separated, twice washed with a total of 10 cc. of ice-cold ethanol, and dried under reduced pressure (20 mm. Hg). 6.3 g. of 2-chloro-10,11-dihydro-11 - [4 - (4 - methoxybenzyl)-1-piperazinyl]dibenzo[b,f] oxepin, M.P. 126° C., are thus obtained.

The invention includes within its scope pharmaceutically compositions comprising, in association with a compatible pharmaceutically acceptable carrier or coating, at least one 10,11-dihydrodibenzo[b,f]-oxepin of Formula I or a non-toxic acid addition salt or quaternary ammonium derivative thereof. These compositions may be in a form suitable for oral, parenteral, or rectal administration.

Solid compositions for oral administration include tablets, pills, powders or granules. In such soild compositions, the active compound is mixed with one or more inert diluents such as sucrose, lactose or starch. These compositions may also comprise, as is normal practice, substances other than diluents, for example a lubricant such as magnesium stearate.

Liquid compositions for oral administration include pharmaceutically acceptable emulsions, solutions, suspensions, syrups and elixirs containing inert diluents such as water or liquid paraffin. These compositions may also comprise substances other than diluents, for example wetting agents, sweetening agents, perfumes, and preservatives.

The compositions according to the invention for parenteral administration may be aqueous or non-aqueous sterile solutions, suspensions or emulsions. As solvent or vehicle, there may be employed propylene glycol, polyethylene glycol, vegetable oils, more particularly olive oil, and the injectable organic esters, for example ethyl oleate. These compositions may also contain adjuvants, more particularly wetting agents, emulsifiers and dispersing agents. The sterilisation may take place in various ways, for example with the aid of a bacteriological filter, by incorporating sterilising agents in the composition, by irradiation or by heating. They may also be prepared in the form of sterile solid compositions which may be dissolved at the time of use in sterile water or any other injectable sterile medium.

Compositions for rectal administration are suppositories which contain, in addition to the active product, excipients such as cacao butter or suppository wax.

The following example illustrates the preparation of a medicinal composition according to the invention.

EXAMPLE 3

Tablets having the following composition are prepared by the usual technique:

|  | Mg. |
|---|---|
| 2-chloro-11-(4-methyl-1-piperazinyl)-10,11-dihydrodibenzo[b,f]oxepin | 25 |
| Starch | 92 |
| Collidal silica | 30 |
| Magnesium stearate | 3 |

We claim:
1. A 10,11-dihydrodibenzo[b,f]oxepin of the formula:

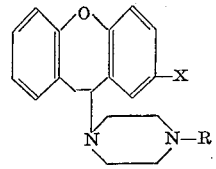

and its non-toxic acid addition salts, in which X is halogen, alkoxy of 1 to 5 carbon atoms, or alkylthio of 1 to 5 carbon atoms, and R is hydrogen, alkyl of 1 to 5 carbon atoms, phenylalkyl of 1 to 5 carbon atoms in the alkyl or phenylalkyl of 1 to 5 carbon atoms in the alkyl in which the phenyl is substituted by halogen, alkyl of 1 to 5 carbon atoms or alkoxy of 1 to 5 carbon atoms.

2. A 10,11-dihydrodibenzo[b,f]oxepin as claimed in claim 1 and its non-toxic acid addition salts, in which X is chlorine and R is alkyl of 1 to 5 carbon atoms or alkoxyphenylalkyl of 1 to 5 carbon atoms in the alkyl and the alkoxy.

3. A 10,11-dihydrodibenzo[b,f]oxepin as claimed in claim 1 being 2-chloro-11-(4-methyl-1-piperazinyl)-10,11-dihydrodibenzo[b,f]oxepin and its non-toxic addition salts.

4. A 10,11-dihydrodibenzo[b,f]oxepin as claimed in claim 1 2-chloro-11-[4-(4-methoxybenzyl)-1-piperazinyl]-10,11-dihydrodibenoz[b,f]oxepin and its non-toxic acid addition salts.

References Cited

UNITED STATES PATENTS

| 3,100,207 | 8/1963 | Zirkle | 260—268 |
| 3,356,681 | 12/1962 | Cusic | 260—268 |
| 3,509,176 | 4/1970 | Winter et al. | 260—268 |

DONALD G. DAUS, Primary Examiner

U.S. Cl. X.R.

260—333, 465, 521, 609, 612; 424—250